(12) United States Patent
Stewart

(10) Patent No.: US 6,539,456 B2
(45) Date of Patent: *Mar. 25, 2003

(54) HARDWARE ACCELERATION OF BOOT-UP UTILIZING A NON-VOLATILE DISK CACHE

(75) Inventor: David C. Stewart, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,000

(22) Filed: Oct. 13, 1999

(65) Prior Publication Data

US 2002/156970 A1 Oct. 24, 2002

(51) Int. Cl.⁷ .............................. G06F 12/00; G06F 9/24
(52) U.S. Cl. ...................... 711/113; 711/133; 711/144; 713/2
(58) Field of Search ................................. 711/113, 133, 711/144; 713/2

(56) References Cited

U.S. PATENT DOCUMENTS

| 5,307,497 | A | * | 4/1994 | Feigenbaum et al. .......... 713/1 |
| 6,061,788 | A | * | 5/2000 | Reynaud et al. ................ 713/2 |
| 6,073,232 | A | * | 6/2000 | Kroeker et al. ................. 713/1 |
| 6,172,936 | B1 | * | 1/2001 | Kitazaki ...................... 365/233 |
| 6,189,100 | B1 | * | 2/2001 | Barr et al. ................... 713/182 |
| 6,226,740 | B1 | * | 5/2001 | Iga ............................... 713/2 |

* cited by examiner

Primary Examiner—Reginald G. Bragdon
(74) Attorney, Agent, or Firm—Schwegman, Lundberg, Woessner & Kluth, P.A.

(57) ABSTRACT

A computer system includes a nonvolatile memory positioned between a disk controller and a disk drive storing a boot program, in a computer system. Upon an initial boot sequence, the boot program is loaded into a cache in the nonvolatile memory. Subsequent boot sequences retrieve the boot program from the cache. Cache validity is maintained by monitoring cache misses, and/or by monitoring writes to the disk such that a write to a sector held in the cache results in the cache line for that sector being invalidated until such time as the cache is updated. A filter driver is provided to monitor writes to the disk and determine if a cache line is invalidated.

38 Claims, 5 Drawing Sheets

HARDWARE ACCELERATION OF BOOT-UP UTILIZING A NON-VOLATILE DISK CACHE

TECHNICAL FIELD OF THE INVENTION

The present invention pertains generally to computers, and more particularly to method and apparatus for speeding the boot-up process in computers.

BACKGROUND OF THE INVENTION

Booting up a computer, and in particular an IBM-compatible personal computer (PC), often takes longer than desired. For example, it is not atypical for a PC using the Windows® 98 operating system to require one minute or more to boot up. This delay can be untenable when the PC needs to be activated on an expedited basis. For instance, if the user needs a phone number quickly, it can be more expeditious to look the number up in a telephone directory as opposed to a PC if the PC requires booting. Thus, unless PC's can be booted more quickly than as is currently the case, their use in applications that require fast initialization is limited. Thus, there is a need for a PC with a shorter boot up time than is currently available.

SUMMARY OF THE INVENTION

The present invention provides method and apparatus for speeding the boot-up of a computer. According to one embodiment of the invention, a boot program stored on a boot disk is cached in a nonvolatile memory, and retrieved by the system from the cache during the boot sequence instead of from the boot disk, thereby increasing the speed of access to the boot program. This and various other embodiments of the invention are described below.

DETAILED DESCRIPTION OF THE INVENTION

Figure 1:
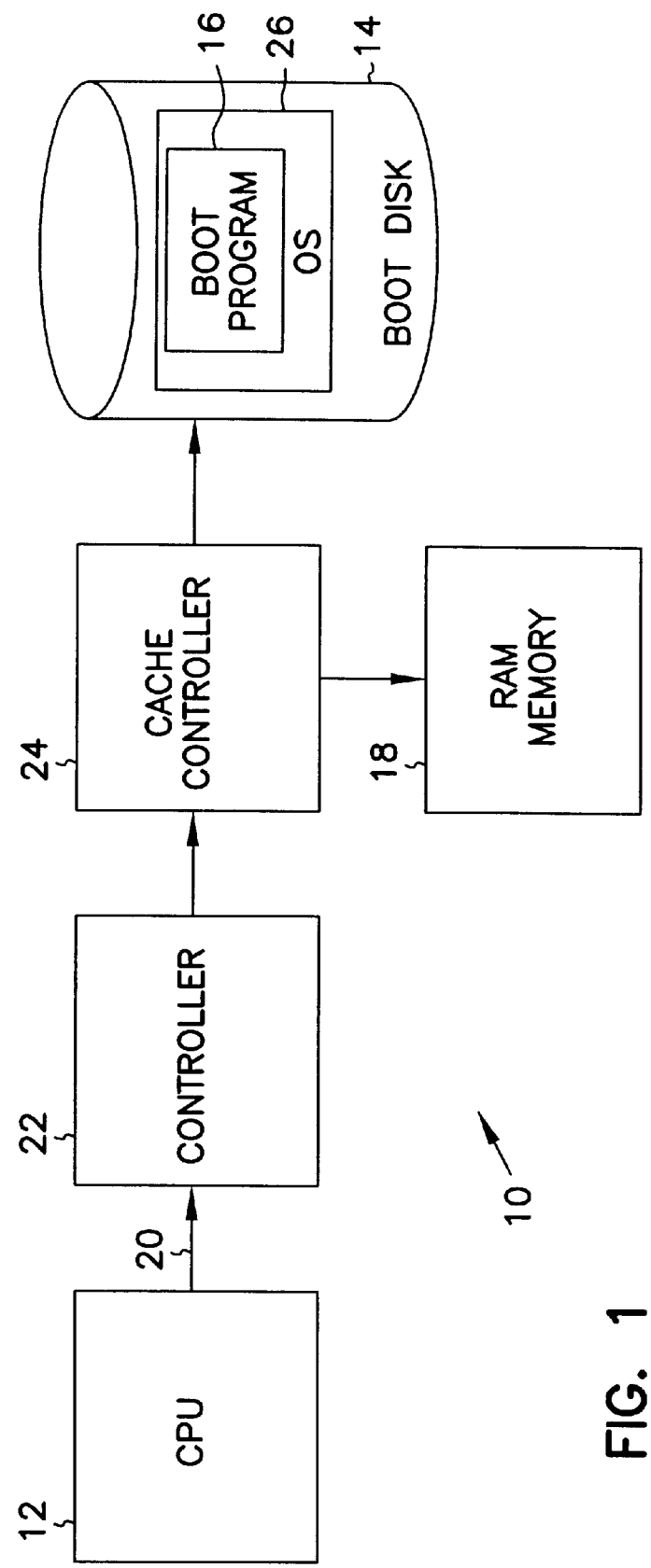
FIG. 1 illustrates a first embodiment of the apparatus of the invention.
Figure 2:
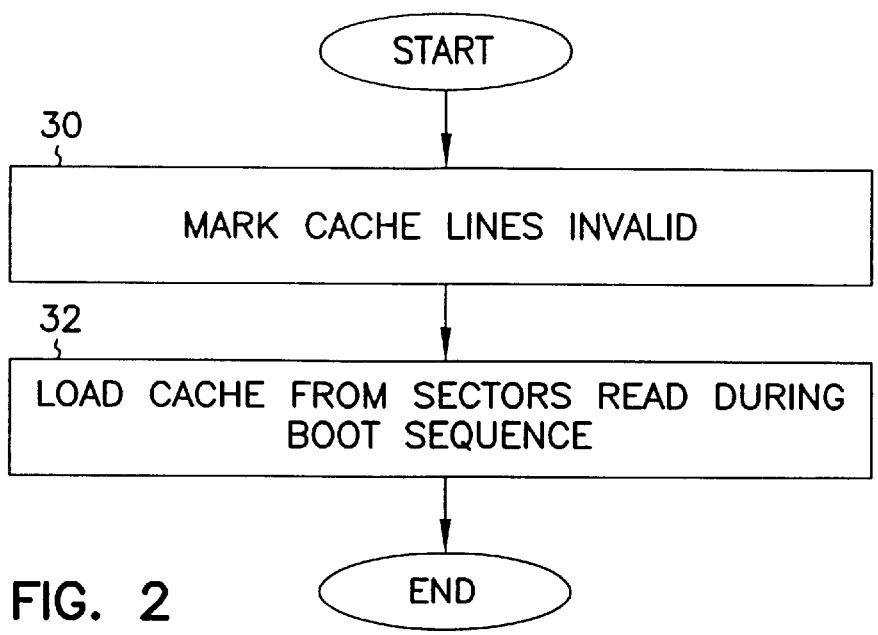
FIGS. 2–5 illustrate various alternate embodiments of the method of using the cache according to the present invention.

In the following detailed description of the invention reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Referring now to FIG. 1, there is shown a first embodiment of the invention. A computer system 10 includes a Central Processing Unit (CPU) 12, a boot disk 14 storing a boot program 16 used by the computer system 10 to boot, and a nonvolatile random access memory 18 used as a disk cache. Memory 18 receives all or a portion of the boot program 16 from the boot disk 14 and stores it for access by the CPU 12 so that the computer system 10 can boot in whole or in part from the disk cache in memory 18. A data bus 20 couples the CPU 12 to a controller 22 that controls the boot disk 14, and a cache controller 24 is coupled between the bus 20 and the boot disk 14, and wherein the memory 18 is coupled to the cache controller 22. In one example embodiment, the computer system 10 may comprise an IBM-compatible computer with a Pentium class microprocessor and an IDE controller for controller 22, or an Apple Macintosh computer with a Motorola microprocessor. The invention, however, is not limited in this respect, and other types of computer systems and processors can be used. Nonvolatile memory 18 may be a FLASH memory, or any suitable form of nonvolatile memory, and, preferably in at least some embodiments of the invention, random access memory.

In operation, the computer system 10 operates under the control of an operating system 26, which includes as a portion thereof boot program 16. Boot program 16 has a boot-time disk footprint of a ascertainable size. The memory 18 is sized to be substantially as large as the boot-time disk footprint, so that the boot program 16 can be cached in the memory 18. However, the memory 18 could be smaller than the footprint, and store only a portion of the entire boot program 16. Alternatively, memory 18 could exceed the size of program 16. All or a portion of boot program 16 can therefore be stored in memory 18, from where it can be more quickly retrieved, as opposed to being retrieved from the boot disk 14, during boot-up of the system 10. If only a portion of the boot program 16 is stored in memory 18, that portion may be retrieved therefrom, with the remaining portion retrieved from the boot disk 14.

Figure 3:
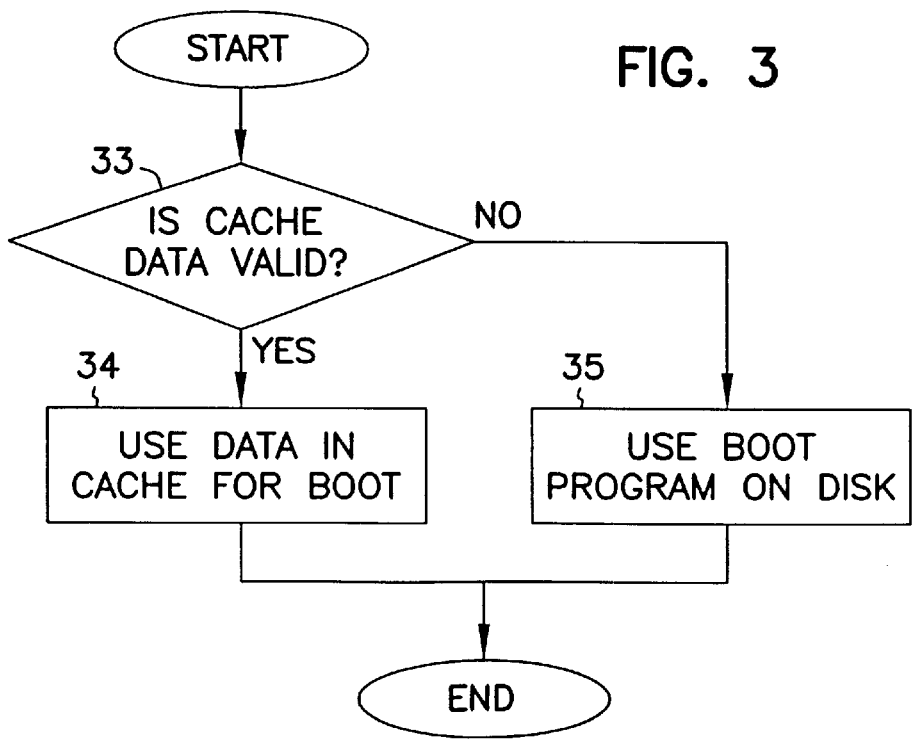
Figure 4:
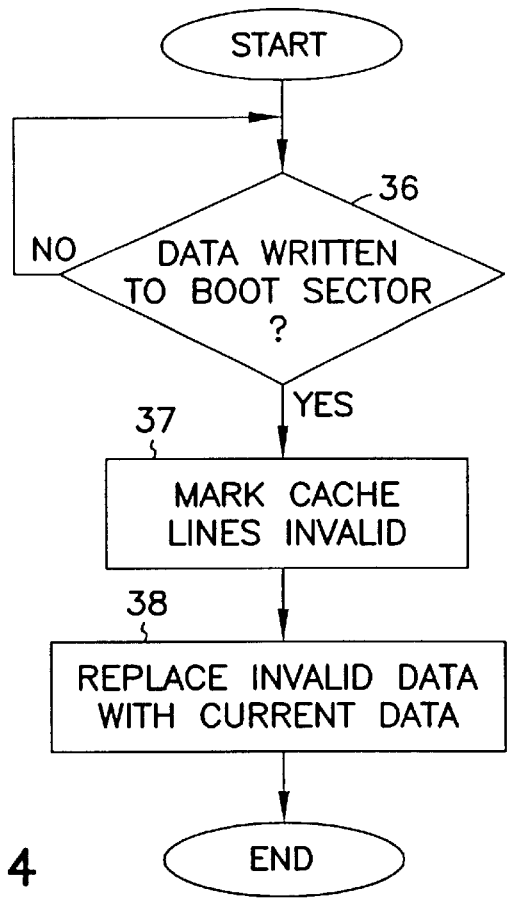
Figure 5:
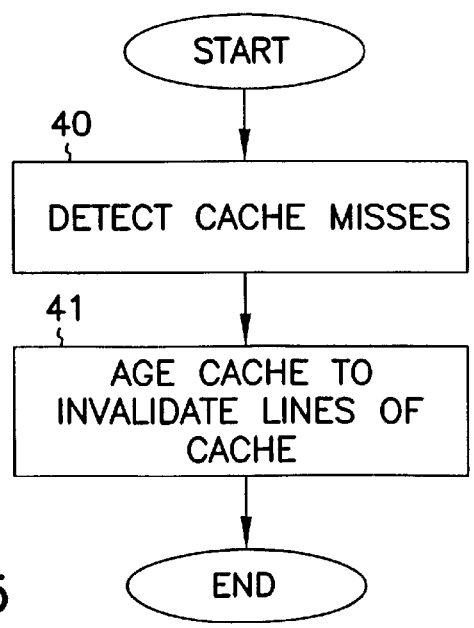

According to another example embodiment, the boot program cache in memory 18 is formed of lines, the boot program 16 is stored in linear sectors on the boot disk 14, and the lines of the cache are mapped to the linear sectors of the boot disk 14 read in a boot sequence upon boot up of system 10. Referring to FIGS. 2–5, there is shown an example method for using the boot program cache. Initially, the cache lines are marked invalid (30). The cache is loaded with data from sectors of disk 14 read during an initial boot sequence (32). As shown in FIG. 3, during boots of the system 10 subsequent to the initial boot sequence, data in the cache is used (34) instead of the corresponding sector data from the boot disk, if the sector data in the cache is valid (33). Otherwise, the boot program or the disk is used (35). According to another example variant of this embodiment shown in FIG. 4, if data is written to a sector read during the initial boot sequence (36), the cache lines corresponding to the sector are marked invalid (37). The invalid cache line can be subsequently replaced with new data from the boot disk and the cache line marked valid (38). According to yet another example embodiment of the method of the present invention, illustrated in FIG. 5, cache coherency is maintained by detecting cache misses (40), and if a miss is detected, aging the cache, to invalidate lines from the cache (41). According to one approach, the cache is aged in a first-in first-out (FIFO) manner.

Figure 6:
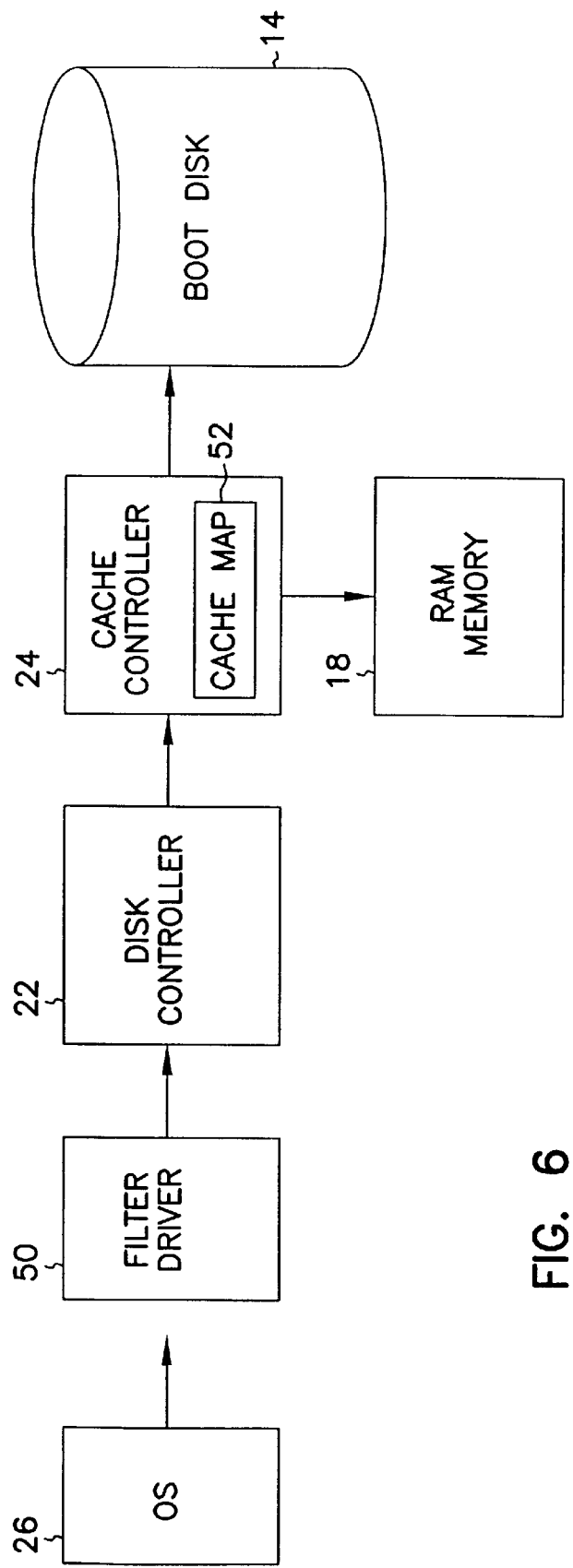
FIG. 6 illustrates an alternate embodiment of the apparatus of the invention.

According to yet another embodiment of the invention diagrammatically illustrated in FIG. 6, a filter driver 50 is positioned between the operating system 26 and the disk controller 22, and the filter driver 50 has access to all input-output (I/O) requests to the boot disk 14, and to a cache map 52 in cache controller 24. Filter driver 50 can detect writes to the disk 14 which are in the same sector as a sector in the cache. In one embodiment, filter driver 50 can monitor all I/O operations without significantly slowing performance of the system.

Figure 7:
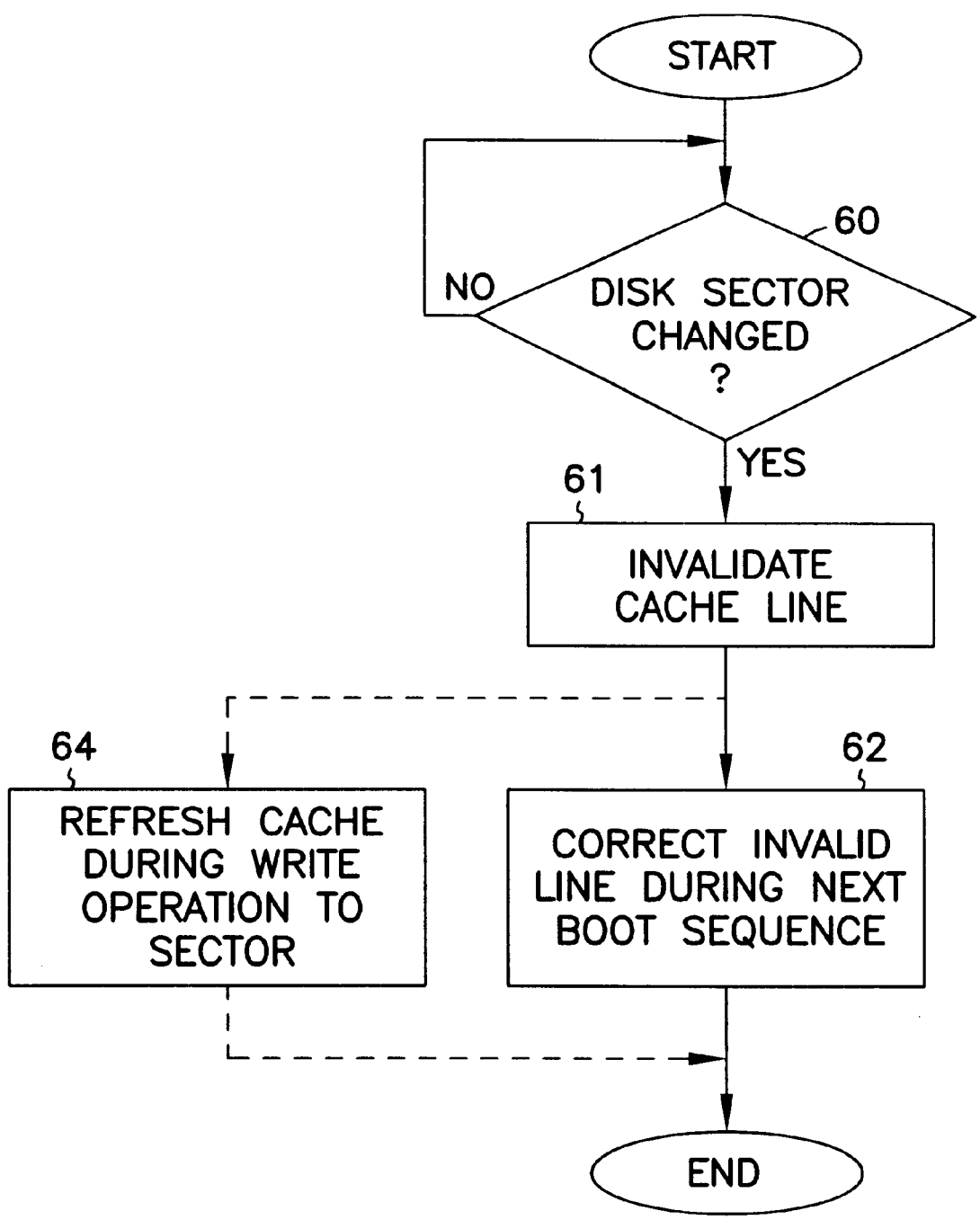
FIG. 7 illustrates yet another embodiment of the method of the invention.

According to a method of operation using the embodiment of FIG. 6, illustrated in FIG. 7, if a disk sector cached in the cache is changed (60), as detected by filter driver 50, the corresponding cache line is invalidated (61). The invalidated line can be refreshed with the correct contents during the next boot sequence (62). In one embodiment, the cache is not updated by the filter driver so that performance is not degraded. However, according to another embodiment, the cache is refreshed during the write operation to the corresponding sector in the disk drive (64) using a cache writeback queue.

Thus, as described above, there is provided method and apparatus for speeding the boot-up of a computer. The invention is applicable to all manner of computer systems, including appliance-like, sealed case systems, where the loadable files and configuration are seldom changed.

What is claimed is:

1. A computer system comprising a CPU, a boot disk storing a boot program used by the computer system to boot, and a nonvolatile memory disk cache receiving all or a portion of the boot program from the boot disk and storing it for access by the CPU so that the computer system can boot in whole or in part from the disk cache, wherein the computer system further includes an IDE controller for controlling the boot disk, wherein the cache has lines, wherein the lines of the cache are mapped to linear sectors read in a boot sequence, wherein the cache lines are initially marked invalid, wherein the cache is loaded with data from sectors read during an initial boot sequence, wherein during boots of the system subsequent to the initial boot sequence sector data in the cache is used instead of the corresponding sector data from the boot disk if the sector data in the cache is valid, and wherein if data is written to a sector read during the initial boot sequence, the cache line corresponding to the sector is marked invalid.

2. The computer system of claim 1, wherein the invalid cache line is replaced with new data from the boot disk and the cache line marked valid.

3. A computer system comprising a CPU, a boot disk storing a boot program used by the computer system to boot, and a nonvolatile memory disk cache receiving all or a portion of the boot program from the boot disk and storing it for access by the CPU so that the computer system can boot in whole or in part from the disk cache, wherein the computer system further includes an IDE controller for controlling the boot disk, wherein the cache has lines, wherein the lines of the cache are mapped to linear sectors read in a boot sequence, wherein the cache lines are initially marked invalid, wherein the cache is loaded with data from sectors read during an initial boot sequence, wherein during boots of the system subsequent to the initial boot sequence sector data in the cache is used instead of the corresponding sector data from the boot disk if the sector data in the cache is valid, and wherein cache coherency is maintained by detecting cache misses, and if a miss is detected, the cache is aged, to invalidate lines from the cache.

4. The computer system of claim 3, wherein the cache is aged in a first-in first-out (FIFO) manner.

5. A computer system comprising a CPU, a boot disk storing a boot program used by the computer system to boot, and a nonvolatile memory disk cache receiving all or a portion of the boot program from the boot disk and storing it for access by the CPU so that the computer system can boot in whole or in part from the disk cache, wherein the computer system further includes an IDE controller for controlling the boot disk, wherein the cache has lines, wherein the lines of the cache are mapped to linear sectors read in a boot sequence, wherein the cache lines are initially marked invalid, wherein the cache is loaded with data from sectors read during an initial boot sequence, wherein during boots of the system subsequent to the initial boot sequence sector data in the cache is used instead of the corresponding sector data from the boot disk if the sector data in the cache is valid, and wherein the computer system further includes a filter driver between the CPU and the IDE controller, wherein the filter driver has access to all input-output (I/O) requests to the boot disk, and wherein the filter driver has access to a cache map and can detect writes to the disk which are in the same sector as a sector in the cache.

6. The computer system of claim 5, further wherein if such a sector is changed, the corresponding cache line is invalidated, and refreshed with the correct contents during the next boot sequence.

7. The computer system of claim 5, wherein the cache is not updated by the filter driver.

8. The computer system of claim 5, wherein the cache is refreshed during the write operation to the corresponding sector in the disk drive.

9. A method comprising storing a boot program used by a computer system in a nonvolatile memory disk cache which receives all or a portion of the boot program from a system boot disk, the boot program stored in the cache for access by the CPU so that the computer system can boot in whole or in part from the disk cache, wherein an IDE controller is used to control the boot disk, wherein the cache is organized in lines, and wherein the lines of the cache are mapped to linear sectors read in a boot sequence, wherein the cache lines are initially marked invalid, wherein the cache is loaded with data from sectors read during an initial boot sequence, wherein during boots of the system subsequent to the initial boot sequence sector data in the cache is used instead of the corresponding sector data from the boot disk if the sector data in the cache is valid, and wherein if data is written to a sector read during the initial boot sequence, the cache line corresponding to the sector is marked invalid.

10. The method of claim 9, wherein the invalid cache line is replaced with new data from the boot disk and the cache line marked valid.

11. A method comprising storing a boot program used by a computer system in a nonvolatile memory disk cache which receives all or a portion of the boot program from a system boot disk, the boot program stored in the cache for access by the CPU so that the computer system can boot in whole or in part from the disk cache, wherein an IDE controller is used to control the boot disk, wherein the cache is organized in lines, and wherein the lines of the cache are mapped to linear sectors read in a boot sequence, wherein the cache lines are initially marked invalid, wherein the cache is loaded with data from sectors read during an initial boot sequence, wherein during boots of the system subsequent to the initial boot sequence sector data in the cache is used instead of the corresponding sector data from the boot disk if the sector data in the cache is valid, and wherein cache coherency is maintained by detecting cache misses, and if a miss is detected, the cache is aged, to invalidate lines from the cache.

12. The method of claim 11, wherein the cache is aged in a first-in first-out (FIFO) manner.

13. A method comprising storing a boot program used by a computer system in a nonvolatile memory disk cache which receives all or a portion of the boot program from a system boot disk, the boot program stored in the cache for access by the CPU so that the computer system can boot in whole or in part from the disk cache, wherein an IDE controller is used to control the boot disk, wherein the cache is organized in lines, and wherein the lines of the cache are mapped to linear sectors read in a boot sequence, wherein the cache lines are initially marked invalid, wherein the cache is loaded with data from sectors read during an initial boot sequence, wherein during boots of the system subsequent to the initial boot sequence sector data in the cache is used instead of the corresponding sector data from the boot disk if the sector data in the cache is valid, and further wherein a filter driver is positioned between the CPU and the IDE controller, and wherein the filter driver has access to all input-output (I/O) requests to the boot disk, and wherein the filter driver has access to a cache map and can detect writes to the disk which are in the same sector as a sector in the cache.

14. The method of claim 13, and further wherein if such a sector is changed, the corresponding cache line is invalidated, and refreshed with the correct contents during the next boot sequence.

15. The method of claim 13, wherein the cache is not updated by the filter driver.

16. The method of claim 13, wherein the cache is refreshed during the write operation to the corresponding sector in the disk drive.

17. A computer system, comprising:
a CPU;
a boot disk storing a boot program used by the computer system to boot;
a nonvolatile memory disk cache receiving all or a portion of the boot program from the boot disk and storing it for access by the CPU, so that the computer system can boot in whole or in part from the disk cache; and
a controller for controlling the boot disk,
wherein the cache has lines that are initially marked invalid, and are mapped to linear sectors read in a boot sequence,
wherein the cache is loaded with data from sectors read during an initial boot sequence,
wherein during boots of the system subsequent to the initial boot, sequence sector data in the cache is used instead of the corresponding sector data from the boot disk if the sector data in the cache is valid, and
wherein if data is written to a sector read during the initial boot sequence, the cache line corresponding to the sector is marked invalid.

18. The computer system of claim 17, further comprising:
a data bus coupled to the CPU; and
a cache controller coupled between the bus and the boot disk,
wherein the disk cache is coupled to the cache controller.

19. The computer system of claim 17, wherein the computer system operates under the control of an operating system, and wherein the operating system has a boot-time disk footprint size and the cache is sized substantially as large as the size of the footprint.

20. The computer system of claim 17, wherein the invalid cache line is replaced with new data from the boot disk and the cache line marked valid.

21. A computer system, comprising:
a CPU;
a boot disk storing a boot program used by the computer system to boot;
a nonvolatile memory disk cache receiving all or a portion of the boot program from the boot disk and storing it for access by the CPU, so that the computer system can boot in whole or in part from the disk cache; and
a controller for controlling the boot disk,
wherein the cache has lines that are initially marked invalid, and are mapped to linear sectors read in a boot sequence,
wherein the cache is loaded with data from sectors read during an initial boot sequence,
wherein during boots of the system subsequent to the initial boot, sequence sector data in the cache is used instead of the corresponding sector data from the boot disk if the sector data in the cache is valid, and
wherein cache coherency is maintained by detecting cache misses, and if a miss is detected, the cache is aged, to invalidate lines from the cache.

22. The computer system of claim 21, wherein the cache is aged in a first-in first-out (FIFO) manner.

23. The computer system of claim 21, further comprising:
a data bus coupled to the CPU; and
a cache controller coupled between the bus and the boot disk,
wherein the disk cache is coupled to the cache controller.

24. The computer system of claim 21, wherein the computer system operates under the control of an operating system, and wherein the operating system has a boot-time disk footprint size and the cache is sized substantially as large as the size of the footprint.

25. A computer system, comprising:
a CPU;
a boot disk storing a boot program used by the computer system to boot;
a nonvolatile memory disk cache receiving all or a portion of the boot program from the boot disk and storing it for access by the CPU, so that the computer system can boot in whole or in part from the disk cache;
a controller for controlling the boot disk; and
a filter driver between the CPU and the controller,
wherein the cache has lines that are initially marked invalid, and are mapped to linear sectors read in a boot sequence,
wherein the cache is loaded with data from sectors read during an initial boot sequence,
wherein during boots of the system subsequent to the initial boot, sequence sector data in the cache is used instead of the corresponding sector data from the boot disk if the sector data in the cache is valid,
wherein the filter driver has access to all input-output (I/O) requests to the boot disk, and
wherein the filter driver has access to a cache map and can detect writes to the disk which are in the same sector as a sector in the cache.

26. The computer system of claim 25, further wherein if such a sector is changed, the corresponding cache line is invalidated, and refreshed with the correct contents during the next boot sequence.

27. The computer system of claim 25, wherein the cache is not updated by the filter driver.

28. The computer system of claim 25, wherein the cache is refreshed during the write operation to the corresponding sector in the disk drive.

29. A method comprising:
storing a boot program used by a computer system in a nonvolatile memory disk cache that receives all or a portion of the boot program from a system boot disk, the boot program stored in the cache for access by a CPU so that the computer system can boot in whole or in part from the disk cache;

controlling the boot disk with a controller;

organizing the cache in lines;

initially marking the lines of the cache as invalid;

mapping the lines of the cache to linear sectors read in a boot sequence;

loading the cache with data from sectors read during an initial boot sequence;

using sequence sector data in the cache instead of the corresponding sector data from the boot disk during boots of the system subsequent to the initial boot if the sector data in the cache is valid; and marking the cache line corresponding to a sector as invalid if data is written to the sector read during the initial boot sequence.

30. The method of claim 29, further comprising providing a data bus that couples the CPU to a cache controller coupled between the bus and the boot disk, wherein the disk cache is coupled to the cache controller.

31. The method of claim 29, further comprising:

replacing the invalid cache line with new data from the book disk; and marking the cache line as valid.

32. A method comprising:

storing a boot program used by a computer system in a nonvolatile memory disk cache that receives all or a portion of the boot program from a system boot disk, the boot program stored in the cache for access by a CPU so that the computer system can boot in whole or in part from the disk cache;

controlling the boot disk with a controller;

organizing the cache in lines;

initially marking the lines of the cache as invalid;

mapping the lines of the cache to linear sectors read in a boot sequence;

loading the cache with data from sectors read during an initial boot sequence;

using sequence sector data in the cache instead of the corresponding sector data from the boot disk during boots of the system subsequent to the initial boot if the sector data in the cache is valid;

maintaining cache coherency by detecting cache misses; and if a miss is detected, aging the cache to invalidate lines from the cache.

33. The method of claim 32, further comprising providing a data bus that couples the CPU to a cache controller coupled between the bus and the boot disk, wherein the disk cache is coupled to the cache controller.

34. The method of claim 32, wherein the aging of the cache includes aging the cache in a first-in first-out (FIFO) manner.

35. A method comprising:

storing a boot program used by a computer system in a nonvolatile memory disk cache that receives all or a portion of the boot program from a system boot disk, the boot program stored in the cache for access by a CPU so that the computer system can boot in whole or in part from the disk cache;

controlling the boot disk with a controller;

organizing the cache in lines;

initially marking the lines of the cache as invalid;

mapping the lines of the cache to linear sectors read in a boot sequence;

loading the cache with data from sectors read during an initial boot sequence;

using sequence sector data in the cache instead of the corresponding sector data from the boot disk during boots of the system subsequent to the initial boot if the sector data in the cache is valid; and positioning a filter driver between the CPU and the controller, wherein the filter driver has access to all input-output (I/O) requests to the boot disk, and wherein the filter driver has access to a cache map and can detect writes to the disk which are in the same sector as a sector in the cache.

36. The method of claim 35, and further wherein the cache is not updated by the filter driver.

37. The method of claim 35, further comprising:

invalidating a cache line if a sector mapped to the cache line is changed; and refreshing the cache line with correct contents during a next boot sequence.

38. The method of claim 35, further comprising refreshing the cache during a write operation to a corresponding sector in the disk.

* * * * *